July 23, 1963   J. F. CONNORS   3,098,630
ANNULAR SUPERSONIC DECELERATOR OR DROGUE
Filed Dec. 20, 1960   2 Sheets-Sheet 1
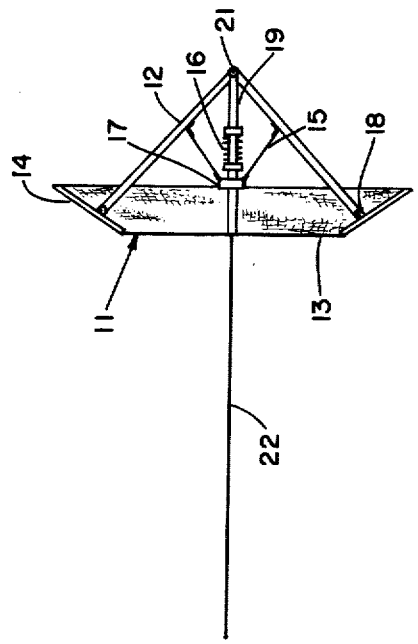
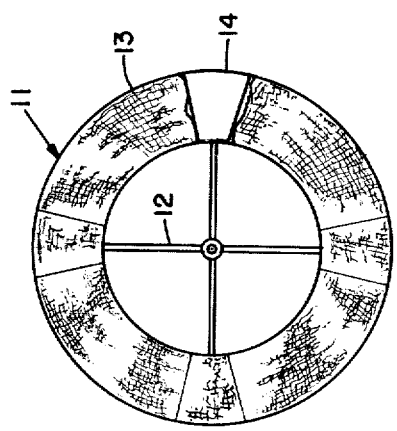
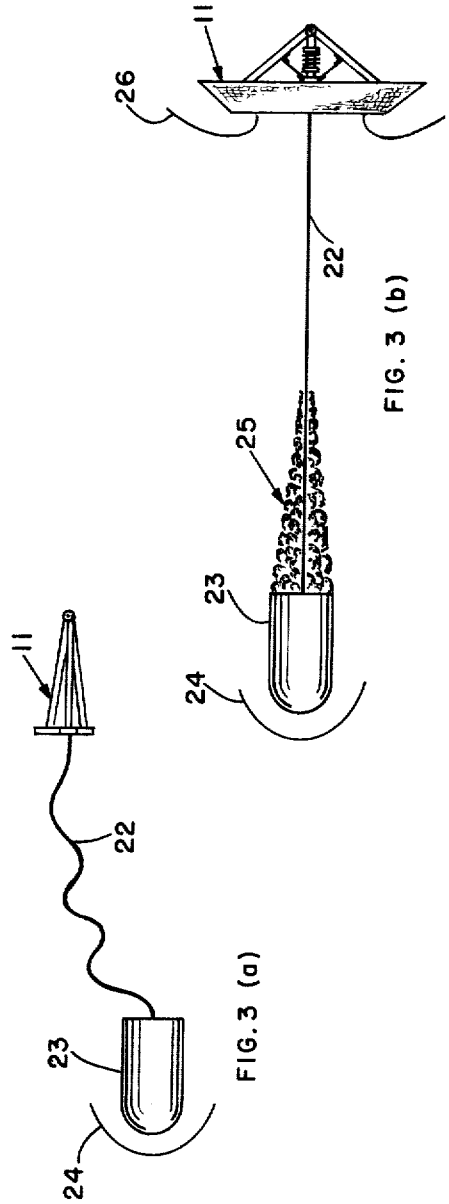
INVENTOR
JAMES F. CONNORS
BY
ATTORNEY July 23, 1963   J. F. CONNORS   3,098,630
ANNULAR SUPERSONIC DECELERATOR OR DROGUE
Filed Dec. 20, 1960   2 Sheets-Sheet 2

*INVENTOR*
JAMES F. CONNORS

BY

*ATTORNEY*

United States Patent Office 3,098,630
Patented July 23, 1963

3,098,630
ANNULAR SUPERSONIC DECELERATOR OR DROGUE
James F. Connors, North Olmsted, Ohio, assignor to the United States of America as represented by the Administrator of the National Aeronautics and Space Administration
Filed Dec. 20, 1960, Ser. No. 77,252
9 Claims. (Cl. 244—113)
(Granted under Title 35, U.S. Code (1952), sec. 266)

The invention described herein may be manufactured and used by or for the Government of the United States of America for governmental purposes without the payment of any royalties thereon or therefor.

This invention pertains to a novel annular supersonic decelerator. Today's high-speed aircraft and missiles demand the use of reliable and efficient supersonic recovery and escape systems. Of prime importance is the safe recovery of man-carrying vehicles and capsules at all supersonic speeds. Other applications for stabilization and deceleration devices would includes the return of instrumented capsules throughout the entire reentry phase and the recovery of large expensive first-stage rocket boosters. The two main criteria used to evaluate the aerodynamic performance of such devices are stability and drag. In most instances, the bodies to be recovered are of buff high-drag shapes, which by themselves achieve high deceleration rates. The problem is to produce a concentrated drag at some particular point in the body to keep it from tumbling and to maintain some predetermined attitude or orientation of the body during free fall. In these cases the steadiness or stability of the applied drag force is most important. Obviously, this is of particular importance with manned payloads.

For Mach numbers less than about 1.5 flexible ribbon-type parachutes appear capable of providing adequate stabilization and deceleration and may be superior to the inflatable balloon decelerator on the basis of stowage, weight, and ease of deployment. However, for Mach numbers greater than about 1.5, both conventional parachutes and the inflatable bluff-shaped balloons encounter increasingly severe shock-boundary-layer interactions resulting in large drag reductions due to conical flow separation along the towlines. The flexibility and multiplicity of towlines around the outer periphery of conventional parachutes additionally make them rather unpredictable and susceptible to violent instabilities and gyrations.

An object of this invention is to provide a highly efficient supersonic decelerator.

Another object of this ivnention is to provide a supersonic decelerator which avoids shock-boundary-layer interaction.

Another object of this invention is to provide a supersonic decelerator which has no flow separation at high supersonic speeds.

Still another object of the invention is to provide a supersonic decelerator that has high stability and reliability.

Other objects and many attendant advantages of the present invention will be apparent from the following detained description when taken together with the accompanying drawings in which:

FIG. 1 is a partially-sectioned pictorial frontal view of the annular supersonic decelerator.

FIG. 2 is a side view of the annular supersonic decelerator shown in FIG. 1.

FIG. 3(a) is a pictorial view of the annular supersonic decelerator shown in relation to a representative payload in the initial deployment stage.

FIG. 3(b) is the supersonic annular decelerator in an extended deployment in relation to the payload.

Figure 4:
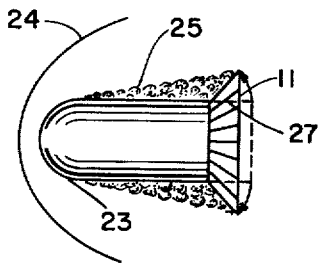
FIG. 4(a) is a schematic view of a payload with the annular decelerator adjacent to the payload prior to being released.
FIG. 4(b) is the decelerator in a deployed position in relation to the payload.
Figure 4:
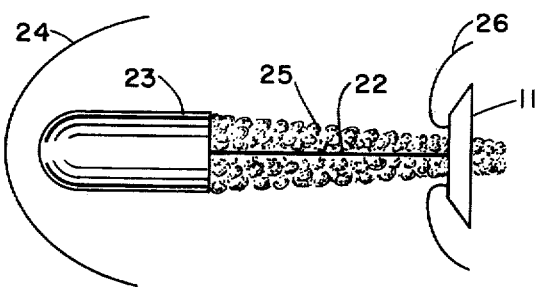

Referring now to the drawings, wherein like reference characters designate like or corresponding parts throughout the several views, there is shown in FIGS. 1 and 2 an annular supersonic decelerator 11 which is similar to an umbrella-like structure having an aperture or open area therein. A plurality of compression rib members 12 are pivotally connected to a center shaft 19 at a pivot point 21. The rib members 12 are additionally pivotally connected to a plurality of plate 14 at a pivot point 18 or in some applications may be rigidly attached at point 18. The plates 14 serve to support the foldable cloth or metallic fabric 13 which serves as the main resistance or the drag-producing area. As can be see the fabric 13 forms a pattern corresponding to the inclined surface of a hollow frusto-cone. The inner circumference of the fabric forms the boundary of an open area which is substantially larger than the area of the shaft 19. As the annular decelerator moves from a closed to the open position shown in FIGS. 1 and 2, a slidable sleeve 17 moves along the shaft 19 causing strut members 15 to react against the ribs 12, forcing the ribs to an open position. The strut members 15 are pivotally connected to both the sleeve member 17 and ribs 12. A shock absorber 16 is provided on the shaft 19 downstream from the sleeve member so as to cushion the reaction force of the sleeve 17 when the decelerator is actuated. A towline 22 connects the decelerator to the payload and can be rigidly attached to shaft 19 by conventional means such as welding.

Referring now to FIG. 3(a), there is shown the payload 23 and the annular decelerator 11 attached thereto by the towline 22. In this view the decelerator is in the initial stage of being deployed prior to the towline becoming taut and opening the device. The shock wave 24 in front of the payload 23 is additionally shown. In FIG. 3(b), a decelerator is shown in its completely deployed position. In this view the wake 25 resulting from the payload 23 is shown as well as the shock wave 26 produced by drag effect of the decelerator 11. As can be seen, this scheme utilizing the annular drag-producing area keeps the shock wave 26 out away from the central towline 22 and its boundary layer. In this way full normal-shock pressure rise is achieved and the drag per unit fabric area is maximized. Thus, by eliminating the interaction of the decelerator shock wave with towline boundary layer and the wake of the payload and its attendant separation and drag-reducing consequences, this annular decelerator is superior to the parachutes and balloons.

As seen in FIG. 4(a) the decelerator can be stowed in a flush position indicated by the dotted lines 27 and upon being actuated would open, as shown in the figure. In some applications, a solid annular decelerator might be stowed in the position shown in the figure. Further deployment of the decelerator would then involve separation of the annular decelerator from the payload and deployment out downstream to a position shown in FIG. 4(b) to achieve the effective boundary-layer control. It is to be noted that the decelerator is shown in FIG. 4(b) to be within the wake 25 of the payload 22 whereas in FIG. 3(b) the decelerator was shown in a deployed position further downstream from the wake. Thus, it should be ascertained that the decelerator may be used at various lengths from the payload.

Figure 5:
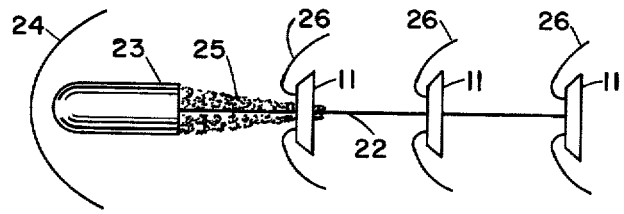
FIG. 5 shows a train or series of the annular supersonic decelerators deployed in relation to a payload.

FIG. 5 shows another embodiment wherein a train or series of annuli could be stowed concentrically and deployed in a series, as shown therein. The actual umbrella mechanisms are not shown in FIGS. 4(a), 4(b), and 5 since these are merely schematic views and serve to show the relative positioning of the decelerator.

It should be made clear that in any of the annular decelerators various shapes and construction details can be employed. A frustoconical decelerator element is illustrated herein because it is basically stable. However, in this given concept inflation devices could also be used to generate the annular shape.

Additionally, it should be pointed out that since the basis of the invention is the use of a bluff-shaped annular decelerator element, any type of annular element can be utilized which provides an obstruction to the supersonic air flow. Maximum bluffness or obstruction occurs by utilizing an annular plate element which, in its operating position, is in perpendicular relationship to the air flow. Amount of bluffness or obstruction is decreased by providing an annular doughnut-shaped element and may be further decreased by providing an annular inclined surface such as, for example, the surface of a hollow frusto-cone. Also, the aforementioned element may be a solid member rather than the flexible umbrella-type shown herein by way of a specific example. The support members securing the bluff-shaped element to the towline or shaft member should be positioned downstream of the element so that the shock wave from the bluff-shaped element will not impinge the support members at a point upstream of the element and further the internal open area of the element should be sufficiently larger than the shaft area so as to prevent impinging of the element shock wave therein; thus preventing towline boundary layer separation and the resultant instability and loss of drag force effectiveness. It is preferred that the towline be attached to the shaft near or downstream of the foremost portion of the decelerator element and further that any area rise at the point of attachment be maintained at a minimum so that the disturbance created by the attachmen will not effect the drag of the decelerator. However, the form of attachment of the towline to the decelerator is unimportant.

What is claimed:

1. A supersonic decelerator comprising in combination: a center shaft; sleeve means concentrically slidable on said shaft; a plurality of support means pivotally connected at one end to said shaft; a plurality of struts interconnecting said sleeve means and said support means; and means to provide a bluff-shaped annulus configuration, said configuration means being supported by said support means, the inner diameter of said configuration means forming the boundary of an open area which is substantially larger than the diameter of said shaft when said support means are in an extended position.

2. A supersonic decelerator comprising means for obstructing a supersonic fluid stream, thereby effecting a shock wave, said obstruction means having an open area, means for supporting said obstruction means, said support means being disposed downstream of said obstruction means, and means for interconnecting said support means to a supersonic vehicle, said interconnecting means having a cross-section area substantially smaller than the open area associated with said obstruction means, thereby preventing intersection of the shock wave with said interconnecting means whereby interconnecting means boundary layer separation is eliminated.

3. A supersonic decelerator comprising a center shaft, a sleeve concentrically slidable on said shaft, a plurality of ribs pivotally connected at one end thereof to an end of said shaft, a plurality of strut members pivotally interconnecting said ribs and said sleeve, a plurality of plates, said plates being pivotally connected to the unsecured ends of said ribs, and a foldable material secured to said plates, said material having a pattern corresponding to the incline surface of a frusto-cone, the smaller diameter of said material being substantially larger than the diameter of said shaft, providing thereby an open area when said ribs are in an extended position.

4. The combination of a supersonic vehicle, a towline, one end of said towline being attached to said vehicle and a decelerator attached to the opposite end of said towline, said decelerator comprising, a center shaft having a front end and an aft end and substantially the same diameter as said towline, the front of said shaft serving as the connecting point to said towline, a plurality of ribs pivotally connected to the aft end of said shaft, means for effecting radial extension of said ribs in a direction away from the front end of said shaft when said decelerator is deployed, a plurality of plates pivotally connected to the unsecured ends of said ribs, and a foldable material secured to said plates, said material having a pattern corresponding to the incline surface of a frusto-cone, the smaller diameter of said material being substantially larger than the diameter of said shaft and said towline, forming thereby an open area when said ribs are in an extended position.

5. A supersonic decelerator, as in claim 3, and including resilient means for cushioning the reaction force of said sleeve when said decelerator is deployed.

6. A supersonic decelerator comprising, a center shaft having a front end and an aft end, support means pivotally connected to the aft end of said shaft, means for effecting radial extension of said support means in a direction away from the front end of said shaft when decelerator is deployed, and means attached to the unsecured ends of said support means for obstructing supersonic flow, thereby effecting a shock wave, said obstructing means having an inner open area substantially larger than the cross-section area of said shaft and said towline whereby the shock wave is prevented from intersecting said shaft and said towline thereby eliminating boundary layer separation.

7. The combination of a supersonic vehicle, a towline attached at one end thereof to said vehicle, and a decelerator, said decelerator comprising a bluff-shaped annular element, support means for supporting said element, said support means being positioned downstream of said element, and means for interconnecting said support means and said towline, said element having an inner diameter forming the outer boundary of an aperture, the area of which is substantially larger than the interconnecting means cross-section area.

8. The combination of claim 7 wherein the buff-shaped annular element is a hollow frusto-cone.

9. The combination of a supersonic vehicle, a towline attached at one end thereof to said vehicle, and at least one decelerator, said decelerator comprising means for obstructing a supersonic fluid stream, thereby effecting a shock wave, said obstruction means having an open area, means for supporting said obstruction means, said support means being disposed downstream of said obstruction means, and means for interconnecting said support means to said towline, said interconnecting means having a cross-section area substantially smaller than said obstruction means open area.

References Cited in the file of this patent

UNITED STATES PATENTS

| | | |
|---|---|---|
| 2,382,442 | Rich et al. | Aug. 14, 1945 |
| 2,678,785 | Graham | May 18, 1954 |
| 2,761,636 | Finlay | Sept. 4, 1956 |
| 2,946,543 | Gordon et al. | July 26, 1960 |
| 2,960,291 | Patterson | Nov. 15, 1960 |

OTHER REFERENCES

Aviation Week, June 22, 1959, pp. 81–82.
Western Aviation, November 1959, pp. 6–7.

UNITED STATES PATENT OFFICE
CERTIFICATE OF CORRECTION

Patent No. 3,098,630            July 23, 1963

James F. Connors

It is hereby certified that error appears in the above numbered patent requiring correction and that the said Letters Patent should read as corrected below.

Column 1, line 21, for "includes" read -- include --; line 27, for "buff" read -- bluff --; line 54, for "Another" read -- A further --; column 2, line 16, for "plate" read -- plates --; line 34, for "the", second occurrence, read -- a --; column 3, line 42, insert the following as a new paragraph:

> Obviously, many modifications and variations of the present invention are possible in the light of the above teachings. It is, therefore, to be understood that within the scope of the appended claims the invention may be practiced other than as specifically described.

column 4, line 49, for "buff-shaped" read -- bluff-shaped --.

Signed and sealed this 11th day of February 1964.

(SEAL)
Attest:

ERNEST W. SWIDER            EDWIN L. REYNOLDS
Attesting Officer            Acting Commissioner of Patents

UNITED STATES PATENT OFFICE
CERTIFICATE OF CORRECTION

Patent No. 3,098,630          July 23, 1963

James F. Connors

It is hereby certified that error appears in the above numbered patent requiring correction and that the said Letters Patent should read as corrected below.

Column 1, line 21, for "includes" read -- include --; line 27, for "buff" read -- bluff --; line 54, for "Another" read -- A further --; column 2, line 16, for "plate" read -- plates --; line 34, for "the", second occurrence, read -- a --; column 3, line 42, insert the following as a new paragraph:

> Obviously, many modifications and variations of the present invention are possible in the light of the above teachings. It is, therefore, to be understood that within the scope of the appended claims the invention may be practiced other than as specifically described.

column 4, line 49, for "buff-shaped" read -- bluff-shaped --.

Signed and sealed this 11th day of February 1964.

(SEAL)
Attest:

ERNEST W. SWIDER          EDWIN L. REYNOLDS
Attesting Officer          Acting Commissioner of Patents